United States Patent

Schuur

Patent Number: 5,590,157
Date of Patent: Dec. 31, 1996

[54] DATA TERMINAL COMPRISING A DEMODULATOR FOR A FSK PHASE-COHERENT MODULATED SIGNAL

[75] Inventor: Cornelis C. M. Schuur, Eindhoven, Netherlands

[73] Assignee: U.S. Philips Corporation, New York, N.Y.

[21] Appl. No.: 544,791

[22] Filed: Oct. 18, 1995

Related U.S. Application Data

[63] Continuation of Ser. No. 245,392, May 18, 1994, abandoned.

[30] Foreign Application Priority Data

May 19, 1993 [EP] European Pat. Off. .............. 93201445
Jun. 28, 1993 [EP] European Pat. Off. .............. 93201872

[51] Int. Cl.⁶ .............................. H03D 3/18; H03D 3/02; H03L 7/00
[52] U.S. Cl. .............................. 375/327; 329/325; 331/25
[58] Field of Search ............................... 375/327, 373, 375/376, 304; 329/300, 301, 303, 325, 307; 331/1 A, 17, 34, 25, 10

[56] References Cited

U.S. PATENT DOCUMENTS

| | | | |
|---|---|---|---|
| 3,674,935 | 7/1972 | Lawrence | 375/327 |
| 4,556,866 | 12/1985 | Gorecki | 375/81 |
| 4,694,257 | 9/1987 | Klein et al. | 329/50 |
| 4,743,867 | 5/1988 | Smith | 331/17 |
| 4,785,255 | 11/1988 | Lucak et al. | 329/126 |
| 5,079,526 | 1/1992 | Heck | 331/2 |
| 5,249,206 | 9/1993 | Appelbaun et al. | 375/120 |
| 5,276,712 | 1/1994 | Pearson | 375/359 |
| 5,278,702 | 1/1994 | Wilson et al. | 375/376 |
| 5,475,344 | 12/1995 | Mareatis et al. | 331/1 A |
| 5,485,484 | 1/1996 | Williams et al. | 375/376 |

FOREIGN PATENT DOCUMENTS

WO9107832  5/1991  WIPO.

OTHER PUBLICATIONS

Motorola Semiconductor Technical Data Advanced Information MC 68194 Carrier Band Modem (cbm) Motorola Feb. 12, 1986.

Primary Examiner—Wellington Chin
Assistant Examiner—Paul Loomis
Attorney, Agent, or Firm—Michael E. Marion

[57] ABSTRACT

Data terminal comprising a demodulator for a FSK phase-coherent modulated signal having at least two frequencies, comprising a PLL circuit (10) in which a phase detector is combined with a real-time integrator (15) and in which a sequencer (5) is included, so that the modulated signal is integrated around the zero crossings before a clock signal and digital data are extracted from this signal after a phase lock. As long as the PLL circuit (10) is in the unlocked state, the frequency with which the integrator (15) is driven by the sequencer (5) is equal to half the bit rate of the modulated signal while, for that matter, this frequency is equal to the bit rate.

6 Claims, 3 Drawing Sheets

DATA TERMINAL COMPRISING A DEMODULATOR FOR A FSK PHASE-COHERENT MODULATED SIGNAL

This is a continuation of application Ser. No. 08/245,392, filed May 18, 1994 now abandoned.

BACKGROUND OF THE INVENTION

The invention relates to a data terminal comprising a demodulator for a FSK phase-coherent modulated signal having at least two frequencies, which demodulator comprises at least a PLL circuit formed by a phase detector, a filter and a controllable oscillator as well as a logic circuit controllable by a sequencer for extracting digital data from said signal.

The invention specifically relates to a demodulator suitable for use in such a data terminal.

A demodulator suitable for such a data terminal is known from U.S. Pat. No. 4,694,257 and from "Motorola Semiconductor Technical Data. Advanced Information MC 68194 Carrierband Modem (CBM)", Motorola, 12 February 1986.

A signal according to IEEE Standard 802.4 for the Token Passing Bus method is a FSK (frequency shift keying) phase-coherent modulated sine wave signal in which a "one" is represented by one full cycle per bit period and a "zero" is represented by two full cycles per bit period, while furthermore a non-data symbol is defined which consists of half a "zero" symbol followed by a full "one" symbol terminated by half a "zero" symbol.

With this signal it is possible to transfer data represented by a specific series of "zeros" and "ones". A message is limited by so-called delimiters which contain the non-data symbol "N". In addition to digital data a FSK phase-coherent modulated signal comprises a clock signal which is related to the bit rate. In a demodulator for such a signal the clock signal is recovered from the modulated signal and the data are extracted from that modulated signal.

SUMMARY OF THE INVENTION

In the known demodulator both the recovery of the clock signal and the extraction of data are based on the detection of zero crossings in the modulated signal by a phase detector in a phase-locked loop (PLL). A special property of the modulated signal is utilized for the recovery of the clock signal. The modulated signal has not more than two frequencies: once and twice the bit rate. When a zero crossing occurs, the known demodulator generates a one-shot signal having a period of 75% of the one-half bit period. With this one-shot signal half the number of zero crossings (edges) coming from the signal component having the high frequency are masked. The result is a signal having a frequency that is twice the bit rate. By dividing the frequency of this signal by a factor of two, a 50% duty cycle signal is obtained having a frequency equal to the bit rate at which the desired clock signal is recovered.

In the known demodulator the data are extracted from the modulated signal by means of decision time windows: for brief periods of time at instants around ¼ and ¾ of a bit period the modulated signal is examined by means of a clock signal for the presence of a zero crossing.

The occurrence of an interference pulse may cause one or several zero crossings in the incoming modulated signal to shift. Since the clock signal is recovered by means of a one-shot pulse activated by a zero crossing, and the zero crossings subsequent to this zero crossing are discarded until this pulse has ended, it may occur that a zero crossing necessary for generating the one-shot pulse is undetected. As a result, the PLL is brought out of the (stable) locked state and the demodulator is again to be synchronized with the modulated incoming signal. A further result of the occurrence of interference is the chance that as a result of the shifts of the zero crossings in the incoming signal the data can no longer be extracted from that signal either.

These drawbacks are all the more annoying, because a demodulator, suitable for data communication signals specified according to the IEEE Standard 802.4 for the Token Passing Bus is particularly intended to be used in an environment for industrial (automated) production, rich in interference sources such as power switches, welding equipment and so on.

It is an object of the invention to provide a data terminal which does not have these drawbacks.

This object is achieved according to the invention in that the phase detector combined with a real-time integrator is arranged as an integrator/phase detector, in that the PLL circuit also comprises the sequencer so that the oscillator output of the controllable oscillator is connected to a control input of the sequencer to drive this sequencer and so that a reference output of the sequencer is connected to a control input of the integrator while the modulated signal is integrated in the integrator/phase detector for a period of time determined by the sequencer.

In a data terminal according to the invention the recovery of the clock signal and the extraction of data from the modulated input signal are also based on the detection of zero crossings. According to the invention this detection is performed, however, by integrating the signal for a period of time in which the zero crossing is expected to take place. Due to the integration the influence of an interference pulse is spread with time, so that the amplitude of this pulse becomes less effective for shifting the zero crossing of the modulated signal, so that in a demodulator according to the invention there is less chance of a zero crossing being undetected.

In an embodiment of a data terminal according to the invention the integrator/phase detector comprises in succession, connected in series and controllable by the sequencer, a switch/modulator, an integrator and a delay circuit.

In this integrator/phase detector not the modulated input signal is integrated, but only the part that results from a multiplication in the switch/modulator of the input signal by a control signal coming from the sequencer, which control signal indicates the integration period. The input signal is sampled in the switch/modulator, so that only the part of the signal that is important for realising a phase lock is processed further, or integrated. After each integration period the sequencer supplies a reset signal to discharge the integrator. The output signal of the integrator has a non-zero mean value even if the input signal of the demodulator is in phase lock. Since this condition complicates the realisation of a phase lock, the output signal of the integrator is not fed back directly to the PLL circuit, but via the delay circuit (sample and hold). In the delay circuit the output signal of the integrator is retained after the integration phase has ended, until the integrator has finished a next integration period. The output signal of the delay circuit is formed by periodic pulses which have a zero amplitude in the state of phase lock.

Phase lock with a FSK phase-coherent modulated signal in a demodulator is made possible according to the invention by a real-time integrator driven with a certain frequency by the sequencer.

In a modulated signal specified according to IEEE Standard 802.4 "ones" and "zeros" are represented by sine-shaped signals having a frequency equal to or twice the bit rate, respectively. A signal thus specified can be phase locked by an integrator integrating with a frequency equal to the bit rate the modulated signal around the bit transitions with the zero crossings that occur in the modulated signal. The sequencer may also by coincidence attempt to realise phase lock at the zero crossing in the middle of a bit period. Depending on the contents of the bit involved, this zero crossing has a positive or negative slope.

A phase lock realised thus represents an unstable situation which, however, cannot be cancelled by the PLL circuit: the system is in a deadlock.

The occurrence of this deadlock is avoided by a preferred embodiment of a data terminal comprising a demodulator according to the invention, in which demodulator the sequencer is arranged for producing a reference signal to drive the integrator, the frequency of which reference signal is equal to half the bit rate of the modulated signal as long as the frequency of the output signal of the controllable oscillator is not coupled to the modulated signal frequency and is, for that matter, equal to the bit rate.

This preferred embodiment is compatible with the specifications according to IEEE Standard 802.4 according to which the data in a FSK phase-coherent modulated signal are preceded by a preamble and a delimiter, and the preamble is formed by successive pairs of "zero-one" symbols. If in this demodulator the integrator is driven with a frequency equal to half the bit rate when the preamble in an incoming modulated signal appears, only zero crossings having either a positive or a negative slope will be integrated and the PLL circuit can be brought to a state of lock which does represent a stable situation. Whether the phase of the signal by which the integrator is driven is the right one (that is to say, whether the sign of the slope of the integrated zero crossing corresponds to the sign required for the demodulator) is verified by the logic circuit for data extraction (the data detector). if the phase is not the right one, the sequencer can make the phase of the reference signal for the integrator shift and/or a circuit is provided that is capable of inverting the modulated signal.

The detection of the state of phase lock can be realised by a circuit known per se further to be referenced clock detector.

The frequency with which the integrator is driven is doubled once the PLL circuit has reached the stable locked state and thus the occurrence of the unstable deadlock is ruled out. This frequency doubling may be realised in known manner if the sequencer utilizes a modulo-8 counter of which four states are inactivated upon a signal from the lock detector, so that, in effect, a modulo-4 counter remains by which a specific signal in a specific period of time can be sampled twice as fast as was the case before that time.

The digital data are extracted from the modulated signal, as this is done with the known demodulator, by opening the sampling windows at instants around ¼ and ¾ of a bit period.

According to the invention the logic circuit for data extraction comprises a data integrator and, connected to the output of this integrator, a comparator which is arranged for assigning to the output signal of the data integrator one of three possible amplitude-determined values per time interval that is determined by the sequencer.

In the data integrator the modulated signal is sampled with a reference signal coming from the sequencer, after which the sampled portions are integrated in the data integrator. In the comparator the output signal of the data integrator is compared with a positive and a negative threshold, it thus being established whether the sampled signal portion has a positive or a negative amplitude or has a zero crossing.

Such a three-level comparator creates an additional possibility to discover certain errors which may occur in the modulated signal. IEEE Standard 802.4 has the ensuing rule that a positive amplitude at one quarter of the bit cycle can only be followed by a negative amplitude after a one-half bit period. Signal distortions frustrating this rule will be identified by this comparator.

BRIEF DESCRIPTION OF THE DRAWINGS

The invention will be further explained in the following with reference to the drawings, in which.

DETAILED DESCRIPTION OF THE PREFERRED EMBODIMENTS

Figure 1:
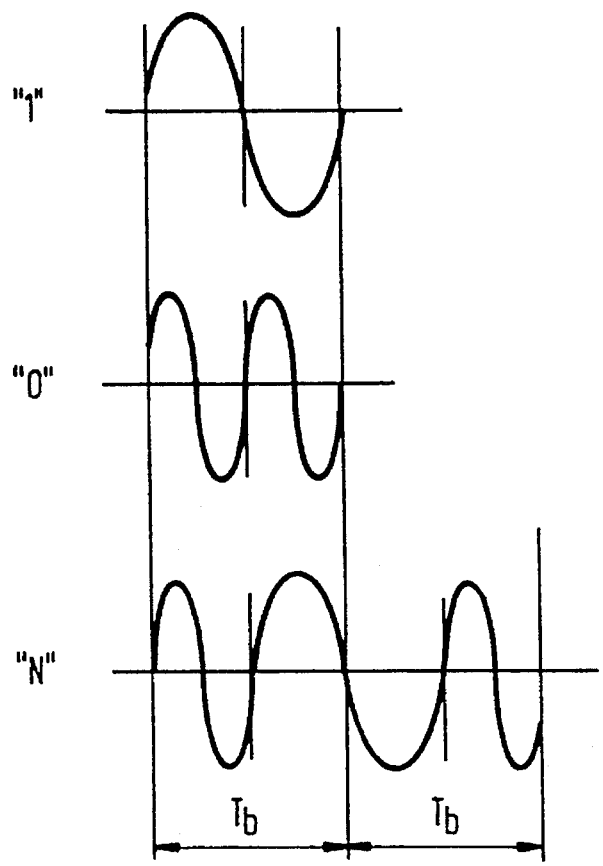
FIG. 1 shows the wave patterns in a FSK phase-coherent modulated sine wave according to the IEEE standard 802.4.

FIG. 1 shows the waveforms in a FSK phase-coherent modulated sine-shaped signal according to IEEE Standard 802.4, with from top to bottom a "one" represented by a sine having frequency 1/Tb, where Tb is the one-bit period, a "zero", represented by a sine having frequency 2/Tb and a non-dam symbol formed by a one-half "zero" symbol followed by a "one" symbol and ended by a one-half "zero" symbol.

Figure 2:
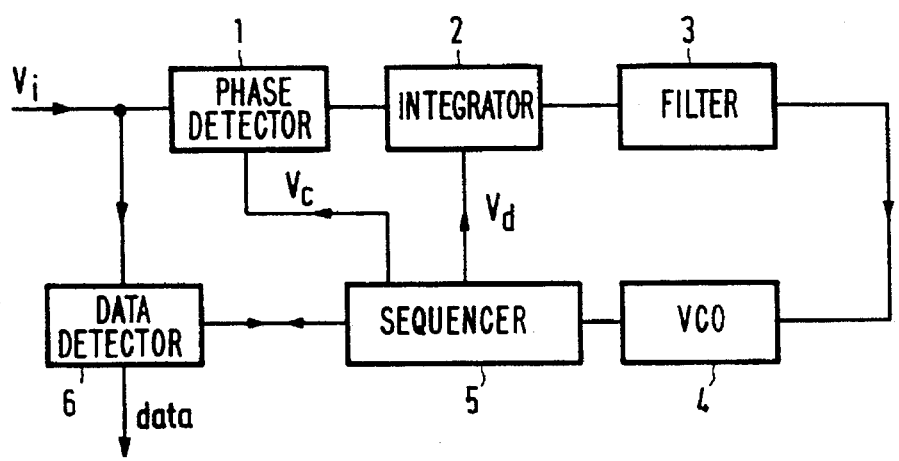
FIG. 2 shows a block diagram of a simple embodiment of a PLL circuit in a demodulator according to the invention.

FIG. 2 shows the block diagram of a simple embodiment for a PLL circuit according to the invention, comprising, in succession, a phase detector (1), an integrator (2), a feedback filter (3), a voltage-controlled oscillator (4) and a sequencer (5), as well as a logic circuit for the extraction of data, the dam detector (6).

In the demodulator the clock signal is recovered from the incoming modulated signal Vi by phase locking the latter on an internal clock signal Vc coming from the voltage-controlled oscillator (4) via the sequencer (5). Once the phase lock has been established, the dam detector (6) is activated by the sequencer (5). As in known demodulators, so is the recovery of the clock signal and the detection of data based on the detection of zero crossings in the signal Vi. According to the invention these zero crossings, however, are detected by integrating the signal Vi in a period of time in which a zero crossing is expected to take place. The integrator (2), together with the phase detector (1) forming the integrator/phase detector, is driven by the sequencer (5) through a reference signal Vd which has a different phase from Vc. FIG. 2 further shows an analog loop filter (3) known per se, comprising, for example, a simple RC-circuit.

Figure 3A:
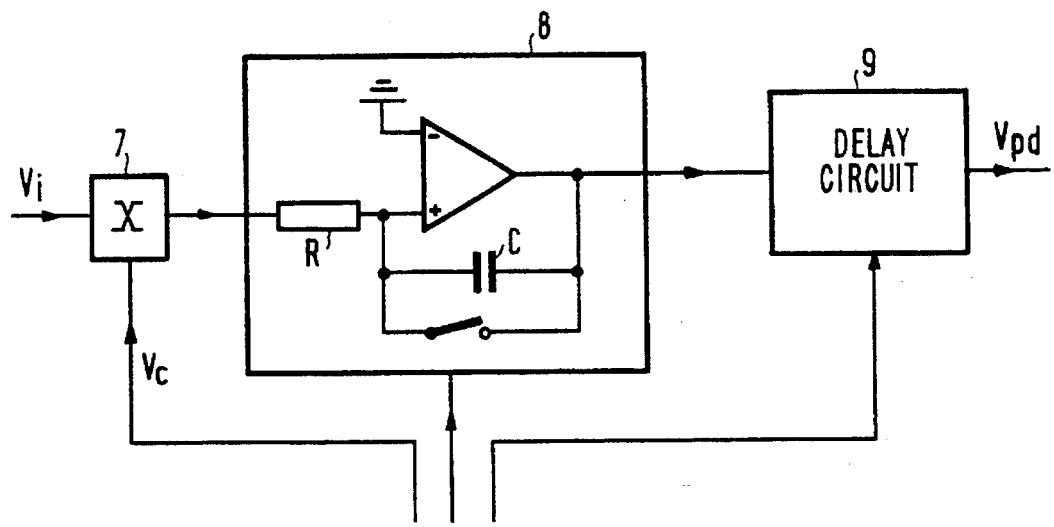
FIG. 3A shows an integrator/phase detector to be used in a data terminal according to the invention.

FIG. 3A shows an integrator/phase detector comprising a switch/modulator (7), an integrator (8) and a delay circuit (sample and hold) (9). The integrator does not process the complete input signal Vi but only the result of the process in which Vi is multiplied in the switch/modulator (7) by a pulse signal coming from the sequencer, which pulse signal covers the integration period.

Figure 3B:
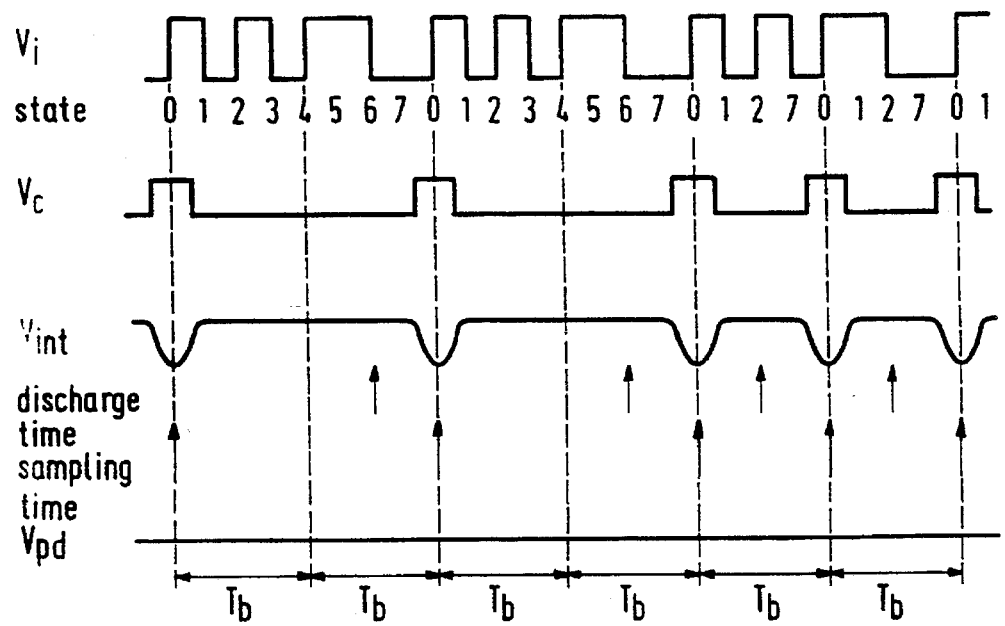
FIG. 3B shows a plurality of signal shapes as they occur in the integrator/phase detector shown in FIG. 3A.

FIG. 3B shows the signal shapes and instants respectively, occurring in this integrator/phase detector as follows from top to bottom:

an input signal having passed a bandpass filter and a limiter, in this example part of a preamble formed by six bit periods comprising each alternately a "zero" and a "one", which signal determines the count of the modulo-8 counter in the sequencer (not shown here) which drives this integrator/phase detector, the signal Vc which determines the integration period and comes from the sequencer, the output signal of the integrator, the instants at which the output signal of the integrator (8) is stored (long arrows) in the delay circuit (9) in response to a signal from the sequencer, the instants at which the integrator (8) is discharged (short arrows) in response to a signal from the sequencer, the output signal Vpd of the phase detector.

In this example the signal Vc derived from the internal clock (in this case the voltage-controlled oscillator) is already in synchronism with Vi, which also appears from the symmetrical shape of the integrator output signal Vint. After the fourth period Tb in the drawing Figure the PLL circuit changes to the lock mode. In the modulo-8 counter of the sequencer four states are omitted due to which, in effect, a modulo-4 counter has arisen, so that the integration period is shortened by a factor of two. In the lock mode the signal is integrated with a frequency equal to the bit rate. The output signal of the integrator (8) is formed by pulses and has, as in the lock mode, a non-zero mean value. Since this is an undesirable situation for the proper operation of a PLL circuit, the output signal of the integrator is not directly fed back to the PLL loop. Instead, the output signal of the integrator is used by a delay circuit (sample and hold) directly after an integration period. The delay circuit, and hence the integrator/phase detector, has thus obtained an output signal changing step-by-step in lieu of a pulsed output signal.

Figure 4:
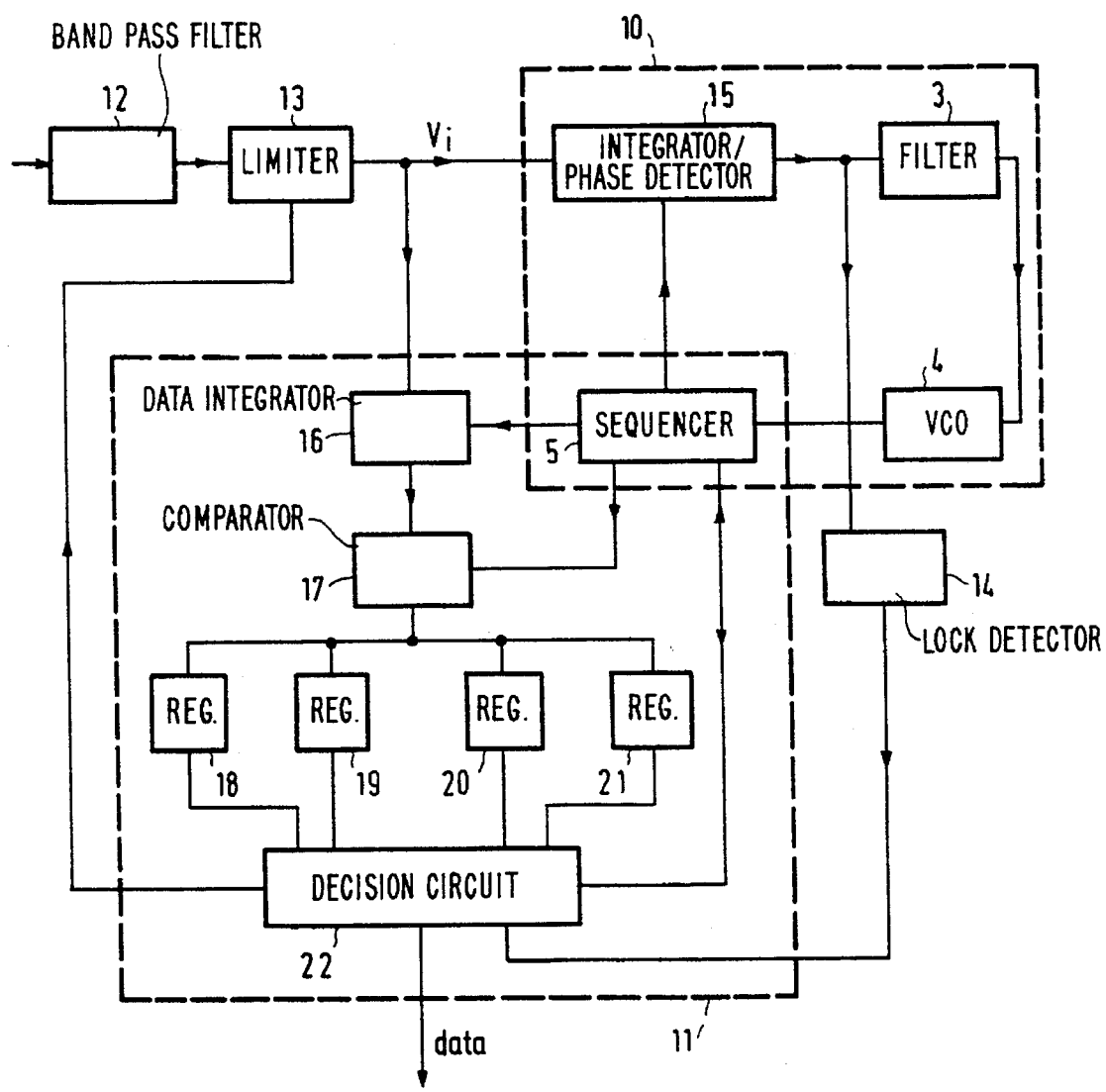
FIG. 4 shows a block diagram of an embodiment for a demodulator according to the invention.

FIG. 4 shows a block diagram of a demodulator according to the invention, mainly formed by a PLL circuit (10) and a logic circuit for extracting digital data (11), (the data detector). The demodulator further includes an analog bandpass filter (12) and a limiter (13) combined with an inverter (not shown) and a PLL lock detector (14). Bandpass filter and limiter are known per se.

The PLL circuit (10) comprises an integrator/phase detector (15), a loop filter (3), a voltage-controlled oscillator (4) and a sequencer (5). The operation of the PLL circuit has been explained above with reference to the FIGS. 2 and 3.

The PLL lock detector (14) indicates when the phase of the modulated input signal Vi is locked. The PLL lock detector is used by way of example by a circuit in which the absolute value of the output signal of the integrator/phase detector (15) is compared with a threshold. If the absolute value is smaller than this threshold, the output signal of the comparator is a logic "one", otherwise a logic "zero". To exclude erroneous states of lock, three successive logic "ones" are to be detected before the lock detector may denote the state of lock. Therefore, a shift register is included having three successive registers (not shown), combined with a 3-input AND circuit (not shown either). The shift register is driven by the sequencer (5).

The sequencer (5) takes up a central position in both the PLL circuit (10) and the data detector (11). This sequencer controls the instants at which all the signal processes in the PLL circuit and the data detector are carried out.

The data detector (11) comprises, in succession, a data integrator (16), a comparator (17), four registers (18 to 21 incl.) and a logic decision circuit (22).

In the data integrator (16) the modulated input signal Vi is integrated after being multiplied by a sampling signal coming from the sequencer (5). This multiplication provides that only the signal portions at instants around ¼ and ¾ of a complete bit period are processed, thus the portions which in conformity with IEEE Standard 802.4 carry the data. The output signal of the data integrator (16) is applied to a comparator (17) which here distinguishes three signal levels: one level above a positive threshold, one level below a negative threshold and one level between the two thresholds. An input signal of which, in succession, two amplitudes are detected to have the same polarity is in conflict with IEEE Standard 802.4 and can therefore be detected as erroneous. Before the PLL circuit has reached the state of lock, the four registers (18 to 21 incl.) are all used for storing the output signal of the comparator (17) per integration period, while the decision circuit (22) activates the registers. After the phase lock has materialized, the integration period is halved and the use of two of the four registers is sufficient. The data ("data") extracted from the modulated input signal and the recovered clock signal ("data clock") become available on the outputs of respectively the decision circuit (22) and the sequencer (5).

I claim:

1. A data terminal including a demodulator for receiving a frequency-shift keyed (FSK) phase-coherent modulated signal having at least two frequencies, said demodulator including a phase-locked loop (PLL) circuit, said PLL circuit comprising:

phase detection and integration means for receiving said modulated signal and generating an integrated signal;

a filter coupled to said phase detection and integration means;

a controllable oscillator coupled to said filter for producing an oscillator signal;

sequencing means, responsive to said oscillator signal and coupled to said phase detection and integration means, for controlling said phase detection and integration means; and logic means, responsive to said sequencing means, for extracting digital data from said modulated signal, wherein said phase detection and integration means comprises means for integrating a portion of said modulated input signal resulting from a product of said modulated input signal and a control signal output by said sequencing means, further wherein said phase detection and integration means includes a switch/modulator circuit, an integrator and a delay circuit, and wherein said sequencing means controls said switch/modulator circuit and said integrator.

2. A data terminal including a demodulator for receiving a frequency-shift keyed (FSK) phase-coherent modulated signal having at least two frequencies, said demodulator including a phase-locked loop (PLL) circuit, said PLL circuit comprising:

phase detection and integration means for receiving said modulated signal and generating an integrated signal;

a filter coupled to said phase detection and integration means;

a controllable oscillator coupled to said filter for producing an oscillator signal;

sequencing means, responsive to said oscillator signal and coupled to said phase detection and integration means, for controlling said phase detection and integration means; and logic means, responsive to said sequencing means, for extracting digital data from said modulated signal, wherein said phase detection and integration means includes a switch/modulator circuit, an integrator and a delay circuit, and wherein said sequencing means controls said switch/modulator circuit and said integrator.

3. The data terminal as claimed in claim 1, wherein said sequencing means produces a control signal to control said phase detection and integration means, a frequency of said control signal is equal to one half of a bit rate of said modulated signal when a frequency of said oscillator signal is not coupled to said frequency of said modulated signal.

4. The data terminal as claimed in claim 3, wherein said frequency of said control signal is equal to a bit rate of said modulated signal when said frequency of said oscillator signal is coupled to said frequency of said modulated signal.

5. A data terminal including a demodulator for receiving a frequency-shift keyed (FSK) phase-coherent modulated signal having at least two frequencies, said demodulator including a phase-locked loop (PLL) circuit, said PLL circuit comprising:

phase detection and integration means for receiving said modulated signal and generating an integrated signal;

a filter coupled to said phase detection and integration means;

a controllable oscillator coupled to said filter for producing an oscillator signal;

sequencing means, responsive to said oscillator signal and coupled to said phase detection and integration means, for controlling said phase detection and integration means; and logic means, responsive to said sequencing means, for extracting digital data from said modulated signal, wherein said logic means includes a data integrator for outputting an output integrator signal and a comparator for comparing said output integrator signal with an amplitude-determined value per time interval, said time interval determined by said sequencing means.

6. A demodulator for receiving a frequency-shift keyed (FSK) phase-coherent modulated signal having at least two frequencies, said demodulator including a phase-locked loop (PLL) circuit, said PLL circuit comprising:

phase detection and integration means for receiving said modulated signal and generating an integrated signal;

a filter coupled to said phase detection and integration means;

a controllable oscillator coupled to said filter for producing an oscillator signal;

sequencing means, responsive to said oscillator signal and coupled to said phase detection and integration means, for determining when said modulated signal is integrated in said phase detection and integration means; and logic means, responsive to said sequencing means, for extracting digital data from said modulated signal, wherein said phase detection and integration means comprises means for integrating a portion of said modulated input signal resulting from a product of said modulated input signal and a control signal output by said sequencing means, further wherein said phase detection and integration means includes a switch/modulator circuit,_ an integrator and a delay circuit, and wherein said sequencing means controls said switch/modulator circuit and said integrator.

\* \* \* \* \*